(12) United States Patent  
Rutter

(10) Patent No.: US 6,662,751 B1  
(45) Date of Patent: Dec. 16, 2003

(54) TIE-OUT SYSTEM

(75) Inventor: Stephen W. Rutter, Patagonia, AZ (US)

(73) Assignee: Khubli, LLC, Patagonia, AZ (US)

( * ) Notice: Subject to any disclaimer, the term of this patent is extended or adjusted under 35 U.S.C. 154(b) by 0 days.

(21) Appl. No.: 10/246,836

(22) Filed: Sep. 18, 2002

Related U.S. Application Data

(63) Continuation-in-part of application No. 10/179,611, filed on Jun. 24, 2002, which is a continuation of application No. 09/690,052, filed on Oct. 16, 2000, now Pat. No. 6,408,793.

(51) Int. Cl.⁷ .................................................. B60P 3/04
(52) U.S. Cl. ...................... 119/400; 119/703; 119/771
(58) Field of Search ........................ 119/786, 87, 88–91, 119/406, 700, 724, 738, 739, 740–759, 766, 769, 771, 783; B60P 3/04

(56) References Cited

U.S. PATENT DOCUMENTS

| | | | |
|---|---|---|---|
| 67,744 A | * 8/1867 | Fitzhugh | 119/789 |
| 86,587 A | * 2/1869 | Race | 24/129 R |
| 191,431 A | * 5/1877 | House | 119/778 |
| 213,084 A | * 3/1879 | Andrews | 119/791 |
| 429,111 A | * 3/1890 | Bailey | 119/778 |
| 466,529 A | * 1/1892 | Rooney | 119/784 |
| 498,351 A | 5/1893 | Kasper | |
| 530,487 A | * 12/1894 | Larson | 119/778 |
| 544,568 A | * 8/1895 | Desailly et al. | 119/523 |
| 606,922 A | * 7/1898 | Gates | 119/783 |
| 916,816 A | * 3/1909 | Williams | 119/778 |
| 963,310 A | * 7/1910 | McCrary | 119/777 |
| 971,392 A | * 9/1910 | Micka | 119/863 |
| 1,120,295 A | * 12/1914 | Jacobson | 119/777 |
| 1,167,793 A | * 1/1916 | Calhoon | 119/778 |
| 1,181,881 A | * 5/1916 | Hausz | 119/780 |
| 1,205,740 A | * 11/1916 | Haugaard | 119/778 |
| 1,220,662 A | * 3/1917 | Massard | 119/778 |
| 1,221,056 A | * 4/1917 | Jacobson | 119/778 |
| 1,228,360 A | * 5/1917 | Franchini | 119/778 |
| 1,233,551 A | * 7/1917 | Choitz | 119/778 |
| 1,730,176 A | * 10/1929 | Thraser et al. | 473/143 |
| 2,259,929 A | * 10/1941 | Evans | 119/783 |
| 3,003,466 A | * 10/1961 | Matarazzo | 119/771 |
| 3,454,275 A | 7/1969 | Pontone | |

(List continued on next page.)

OTHER PUBLICATIONS

"Fastest Hitch in The West", Quick Draw Hitching Systems, Inc. brochure.

Primary Examiner—Charles T. Jordan  
Assistant Examiner—Stephen Holzen  
(74) Attorney, Agent, or Firm—Schmeiser, Olsen & Watts

(57) ABSTRACT

A flexible, rotatable, removably detachable tie-out system configured to mount easily for set-up, adjustment, storage, and the like on horse trailers or other structures. The tie-out system includes a base. Coupled to the base is a receiver configured to both receive a connector and allow rotation of the same therein. The connector is coupled to a tie-out that includes a flexible portion, the flexible portion configured to both allow substantially universal motion of the tie-out and dampen the pulls and tugs of an animal, while preventing damage to a trailer or other structure, the tie-out, and the animal. The tie-out may be rotated and stored attached to or removed from a trailer while traveling. Furthermore, by having additional bases and receivers mounted where convenient, a detached tie-out may be moved to multiple sites on the trailer or to a building or other structure as the need arises.

27 Claims, 7 Drawing Sheets

U.S. PATENT DOCUMENTS

| | | | | |
|---|---|---|---|---|
| 3,636,594 A | * | 1/1972 | Faivre | 24/298 |
| 3,648,664 A | * | 3/1972 | Nunley | 119/785 |
| 3,824,961 A | * | 7/1974 | Webb | 119/700 |
| 3,900,009 A | * | 8/1975 | Rodrigues | 119/752 |
| 4,134,364 A | * | 1/1979 | Boncela | 119/703 |
| 4,159,142 A | * | 6/1979 | Larson | 296/24.2 |
| 4,170,962 A | * | 10/1979 | Limbaugh | 119/795 |
| 4,197,818 A | * | 4/1980 | Cowan et al. | 119/781 |
| 4,261,296 A | * | 4/1981 | Rosenberg | 119/756 |
| 4,355,594 A | * | 10/1982 | Wagner | 119/400 |
| D269,556 S | * | 6/1983 | Studley et al. | D30/154 |
| 4,442,794 A | * | 4/1984 | Redmann | 119/778 |
| 4,509,462 A | * | 4/1985 | Pickett | 119/780 |
| 4,522,153 A | * | 6/1985 | Vander Horst | 119/799 |
| 4,570,577 A | * | 2/1986 | Bellinger | 119/725 |
| 4,681,303 A | * | 7/1987 | Grassano | 267/113 |
| 4,854,269 A | * | 8/1989 | Arntzen | 119/703 |
| 4,947,801 A | * | 8/1990 | Glass | 119/771 |
| 5,215,037 A | * | 6/1993 | Allred | 119/771 |
| 5,305,712 A | * | 4/1994 | Goldstein | 119/784 |
| 5,375,561 A | * | 12/1994 | Gundersen | 119/771 |
| 5,501,180 A | * | 3/1996 | Beere | 119/858 |
| 5,526,774 A | * | 6/1996 | Swindall et al. | 119/787 |
| 5,632,233 A | * | 5/1997 | Kovach | 119/771 |
| 5,775,264 A | * | 7/1998 | Dixon et al. | 119/771 |
| 5,860,198 A | * | 1/1999 | Buntin, Jr. | 24/600.5 |
| 6,082,306 A | * | 7/2000 | Hatfield | 119/524 |
| 6,082,308 A | * | 7/2000 | Walter | 119/769 |
| 6,142,103 A | * | 11/2000 | Meyers et al. | 119/771 |
| 6,247,428 B1 | * | 6/2001 | Mireles | 119/795 |
| 6,253,713 B1 | * | 7/2001 | Giedeman et al. | 119/771 |
| 6,267,081 B1 | * | 7/2001 | Rich | 119/772 |
| 6,308,662 B1 | * | 10/2001 | Furman | 119/776 |
| 6,318,302 B1 | * | 11/2001 | Bedient | 119/786 |
| 6,408,793 B1 | * | 6/2002 | Rutter | 119/400 |
| 6,454,275 B1 | * | 9/2002 | Vick et al. | 277/634 |
| 6,578,524 B2 | * | 6/2003 | Rutter | 119/400 |

* cited by examiner

TIE-OUT SYSTEM

CROSS REFERENCE TO RELATED APPLICATIONS

This application is a continuation-in-part of the earlier patent application entitled "FLEXIBLE AND REMOVABLY DETACHABLE TIE-OUT AND SYSTEM OF SAME," Ser. No. 10/179,611, filed Jun. 24, 2002, now pending, which is a continuation of the earlier patent application entitled "FLEXIBLE AND REMOVABLY DETACHABLE TIE-OUT AND SYSTEM OF SAME," Ser. No. 09/690,052, filed Oct. 16, 2000, now U.S. Pat. No. 6,408,793, the disclosures of which are hereby incorporated herein by reference.

BACKGROUND OF THE INVENTION

1. Technical Field

This invention relates to the field of animal restraints. More specifically, the invention relates to a tie-out system.

2. Background Art

Generally, animal tie-outs, such as for a horse, have previously been provided. Some of these conventional tie-outs have been attached to trailers. However, conventional tie-outs have certain drawbacks.

Conventional tie-outs are rigid and permanent restraints. Accordingly, when an attached animal pulls against these restraints, conventional tie-outs are subject to bending breaks, the trailer, the tie-out, the animal, and/or a rider, if near by, may be damaged or injured. Furthermore, conventional tie-outs cannot be used on all trailers due to obstructing trailer doors, windows, awning structures, and rain gutters for example. Even if conventional tie-outs could be mounted to trailers or other structures, they are permanently attached. Thus, for example, conventional tie-outs cannot be removed from trailers while traveling, or detached and transferred to another trailer, building, or structure.

Conventional tie-outs are also fixed restraints. That is, once mounted to a trailer or other structure for example, conventional tie-outs are not configured to adjust/rotate. Thus, for example, if conventional tie-outs are trailer-mounted, operators cannot rotate protruding tie-outs flush against trailer sides to store them attached to the trailer while traveling. Furthermore, operators cannot adjust/rotate the position of conventional tie-outs to accommodate multiple tie-outs and animals on a side of a trailer or to just have tie-outs protrude from trailer sides at any angle other than perpendicular for example.

Accordingly, what is needed is a tie-out system that overcomes the bending/breaking, trailer incompatibility, non-detachability, and non-rotatability drawbacks of conventional, permanent, structurally rigid, fixed tie-outs.

SUMMARY OF THE INVENTION

The invention solves these problems through a flexible, rotatable, removably detachable tie-out system. In one embodiment of the invention, a tie-out system may include a base configured to couple to a structure. Coupled to the base is a receiver configured to removably and rotatingly receive a connector. The connector is configured to rotate within the receiver and to removably couple the receiver to a tie-out, the connector comprising a lower portion and an upper portion, the lower portion removably and rotatingly coupled within the receiver. The connector is coupled to a tie-out that includes a flexible portion. The tie-out is configured to restrain an animal attached thereto, and the tie-out is coupled to the upper portion of the connector and comprises a flexible portion.

In another embodiment of the invention, a tie-out system for use with a trailer includes a channeled base configured to couple to the trailer, the channeled base comprising a base portion having opposing sides extending outwardly and substantially perpendicular therefrom. Coupled to the channeled base is an annularly cylindrical receiver configured to removably and rotatingly receive a connector. The connector is configured to rotate within the receiver and to removably couple the receiver to a tie-out, the connector comprising a cylindrical lower portion and an upper partially obround portion, the lower portion removably and rotatingly coupled within the receiver. The tie-out is configured to restrain an animal attached thereto, the tie-out comprising a flexible portion. The flexible portion comprises a first end portion and a second end portion, the first end portion coupled to the upper portion of the connector. In addition, the flexible portion has a quiescent state and a flexed state, whereby the application of a predetermined amount of pressure on the flexible portion will move the flexible portion from its quiescent state to its flexed state, the flexible portion configured to return to its quiescent state as the predetermined amount of pressure lessens to an amount below the predetermined amount of pressure.

In still another embodiment of the invention, a tie-out system for use with a trailer includes a channeled base configured to couple to the trailer, the channeled base comprising a base portion having opposing sides extending outwardly and substantially perpendicular therefrom, the base portion comprising a pair of opposing apertures configured to receive therethrough a pair of bolts so as to couple the tie-out system to the trailer, and the opposing sides each comprising beveled corner portions configured to provide clearance for the flexible portion as the connector rotates in the receiver. Coupled the opposing sides of the channeled base is an annularly cylindrical receiver configured to removably and rotatingly receive a connector. The connector is configured to rotate within the receiver and to removably couple the receiver to a tie-out, the connector comprising a cylindrical lower portion and a partially obround upper portion comprising at least one face thereon. The lower portion is removably and rotatingly coupled within the receiver. The receiver and the lower portion of the connector each comprise aligning apertures configured to removably receive a securing pin to removably couple the lower portion of the connector within the receiver. The tie-out is configured to restrain an animal attached thereto, the tie-out comprising a rigid portion with a first end portion and a second end portion and comprising a first end portion and a second end portion. The first end portion of the flexible portion is coupled to the at least one face of the upper portion of the connector and the second end portion of the flexible portion is coupled to the first end portion of the rigid portion.

Some advantages of this invention may be that the partially flexible tie-out absorbs the pulls and tugs of a horse or other animal. Furthermore, the damping ability of the partially flexible tie-out prevents damage to a trailer, the tie-out, and the animal. Moreover, the partially flexible tie-out allows for substantially universal motion of itself as a horse or other animal pulls and tugs.

Other advantages of the invention may be that the tie-out system may be mounted easily for set-up, adjustment, storage, and the like on horse trailers or other structures. Furthermore, if the invention is trailer-mounted, it may be rotated and stored attached to the trailer while traveling, or removed from the trailer and stored separately while traveling. Moreover, the invention's detachability allows it to be used on virtually any trailer, building, or structure, and by having additional bases and receivers mounted where convenient, a detached tie-out may be moved to multiple sites on the trailer or to a building or other structure as the need arises.

The foregoing and other features and advantages of the invention will be apparent to those of ordinary skill in the art from the following more particular description of the invention and the accompanying drawings.

BRIEF DESCRIPTION OF THE DRAWINGS

Embodiments of the invention will hereinafter be described in conjunction with the appended drawings, where like designations denote like elements, and.

DETAILED DESCRIPTION OF THE INVENTION

Figure 1:
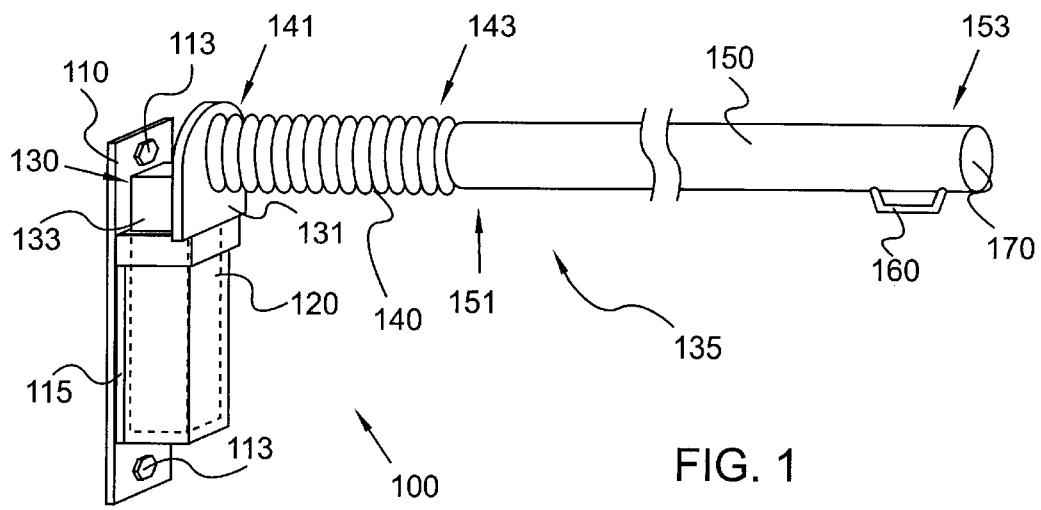
FIG. 1 is an isometric view of a tie-out system of the invention.

It will be understood by those of ordinary skill in the art that the invention is not limited to the specific structures illustrated in the drawings, as any structures known in the art consistent with the intended mechanical operation of a tie-out system of the invention may be utilized. Accordingly, for example, although particular bases, receivers, connectors, tie-outs, and other components are illustrated in the drawings, such components may comprise any shape, size, style, measurement, material, and/or the like as is known in the art for such components consistent with the intended mechanical operation of a tie-out system of the invention. It will also be understood by those of ordinary skill in the art that the invention is not limited to use of any specific components, provided that the components selected are consistent with the intended mechanical operation of a tie-out system of the invention.

Generally, a tie-out system configured to mount easily for set-up, adjustment, storage, and the like on horse trailers or other structures may include a base. Coupled to the base may be a receiver configured to both receive a connector and, in some embodiments, allow rotation of the same therein. The connector may be coupled to a tie-out that includes a flexible portion, the flexible portion configured to both allow substantially universal motion of the tie-out and dampen the pulls and tugs of an animal, while preventing damage to a trailer or other structure, the tie-out, and the animal. The tie-out may be rotated and stored attached to or removed from a trailer while traveling. Furthermore, by having additional bases and receivers mounted where convenient, a detached tie-out may be moved to multiple sites on the trailer or to a building or other structure as the need arises.

Figure 2:
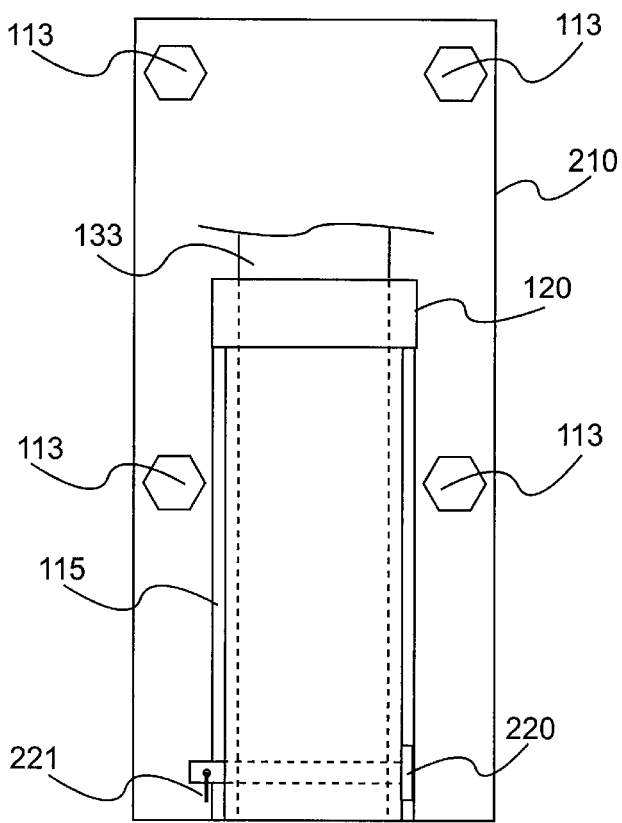
FIG. 2 is a front plan view of various components of another tie-out system of the invention.
Figure 3:
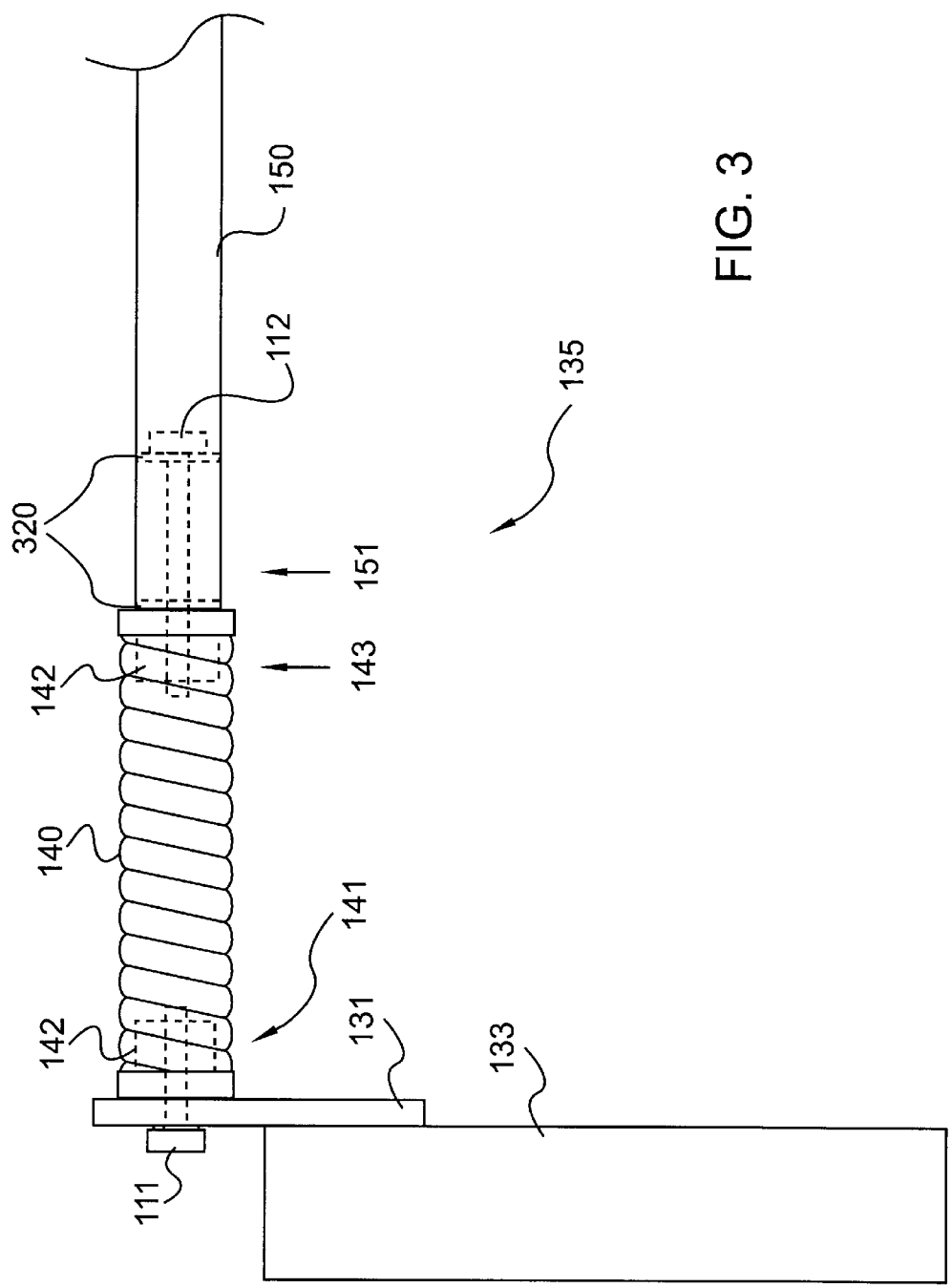
FIG. 3 is a side view of various components of the tie-out system of FIG. 1.

Accordingly, although the invention may be readily adapted to a variety of embodiments of a tie-out system, with reference to FIGS. 1–3, tie-out system 100 is an example of a tie-out system of the invention.

Tie-out system 100 generally includes a base 110. Coupled to and set out from base 110 is a receiver 120 that is adapted to receive a connector 130. Connector 130 is adapted to removably couple receiver 120 to tie-out 135. Tie-out 135 includes a rigid portion 150 removably coupled to a flexible portion 140. Rigid portion 150 of tie-out 135 includes a first end portion 151 and a second end portion 153, and flexible portion 140 of tie-out 135 includes a first end portion 141 and a second end portion 143. First end portion 141 of flexible portion 140 is coupled to face plate 131 of connector 130 and second end portion 143 of flexible portion 140 is coupled to first end portion 151 of rigid portion 150.

Referring to FIGS. 1 and 3 and describing tie-out system 100 in greater detail, tie-out system 100 may include base 110, receiver 120, connector 130, and tie-out 135. Tie-out system 100 may be coupled to a trailer, but could be removably coupled to any device, object, product, building, structure, or the like suitable for use in retaining an animal such as a horse.

Base 110 may be permanently coupled to a trailer or any other structure, but could be adapted to be removably coupled. Base 110 may be coupled to a trailer or any other structure by at least two bolts 113. For the exemplary purposes of this disclosure, base 110 may be approximately 2" in width, approximately 12" in length, and approximately ¼" in depth, but could be a variety of widths, lengths, or depths.

Receiver 120 is configured to removably receive connector 130. For the exemplary purposes of this disclosure, receiver 120 may have a 1¼" square opening, though the opening could be various sizes and/or shapes depending upon the shape and size of connector 130. Receiver 120 is coupled to and set out from base 110. Spacer 115 is coupled to base 110 to set out receiver 120. For the exemplary purposes of this disclosure, spacer 115 may be approximately ¼" to ½" in width. Spacer 115 allows clearance for receiver 120 to removably receive connector 130 without interfering with, for example, rain gutters on a trailer or heads of bolts 113 of base 110.

Connector 130 is adapted to removably couple receiver 120 to tie-out 135. Connector 130 may include bar 133 and face plate 131. For the exemplary purposes of this disclosure, bar 133 may be a 1¼" square steel bar of any length suitable for removable slidable engagement with receiver 120, but could be any shape depending upon the shape of receiver 120 for example. Face plate 131 may be any size, shape, or the like suitable for allowing connector portion 130 to removably couple with tie-out 135.

Figure 4:
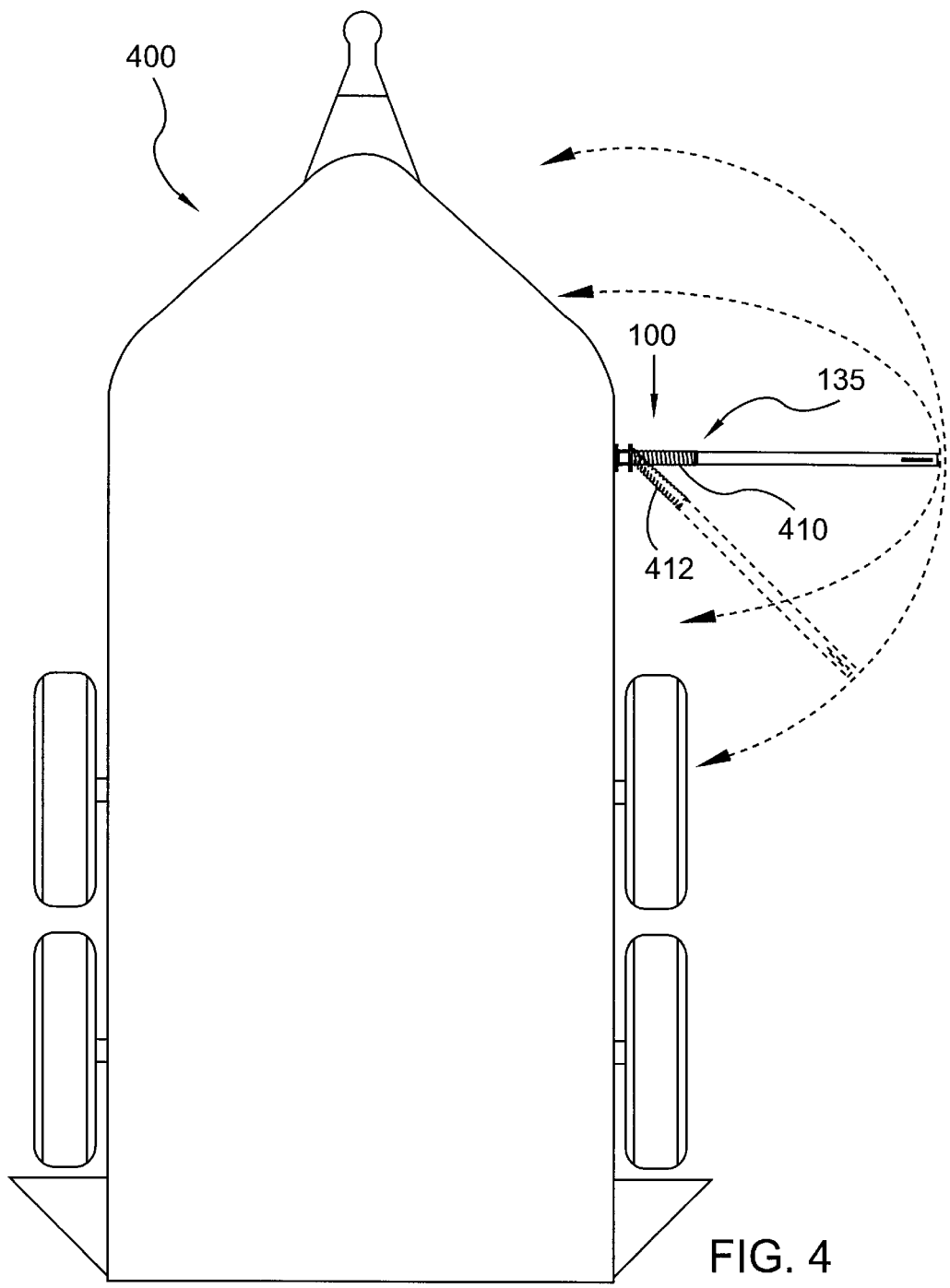
FIG. 4 is a top plan view of the tie-out system of FIG. 1 in conjunction with a trailer.

Describing tie-out 135 in greater detail, tie-out 135 includes flexible portion 140 and rigid portion 150. As depicted in FIG. 4, flexible portion 140 has a quiescent state 410 and a flexed state 412, such that flexible portion 140 may be able to flex and bend axially, but strong and resilient enough to return to its previous position. For the exemplary purposes of this disclosure, flexible portion 140 may be approximately 9" long with approximately a 2⅝" outside diameter, but could have various lengths and have various outside diameters depending upon the amount of applied pressure it will be subject to, among other variables. Furthermore, flexible portion 140 may be assorted shapes as well.

For the exemplary purposes of this disclosure, rigid portion 150 may be approximately 38" long with approximately a 1⅛" outside diameter, but could be of varied lengths according to particular situations and needs. Similarly, rigid portion 150 could be of various outside diameters depending upon the materials used and the strength required. Tie loop 160 may be coupled to the second end portion of rigid portion 150. For the exemplary purposes of this disclosure, tie loop 160 may be a bale of approximately 5/16" to ½" diameter curved rod that defines approximately a 2¼" opening at second end portion 153 of rigid portion 150, but could be of various diameters and could define a variety of opening sizes. Furthermore, tie loop 160 could include a series of tie loops positioned longitudinally along second end portion 153 of rigid portion 150 so that attachment of a tie, as hereinafter described, may be located depending upon the animal and the estimated amount of pressure the animal will exert on flexible portion 140 for example. A cap 170 may also be coupled to second end portion 153 of rigid portion 150 if it is a pipe, for example, and cap 170 may incorporate tie loop 160.

Referring specifically to FIG. 3, flexible portion 140 is removably coupled to rigid portion 150 to form tie-out 135. Rigid portion 150 may be removably coupled to flexible portion 140 by at least one threaded bolt 112 coupled to first end portion 151 of rigid portion 150 in removable threadable engagement with at least one flexible portion insert 142 adapted to receive threaded bolt 112. Specifically, threaded bolt 112 extends through at least one insert 320. Insert 320 is secured within first end portion 151 of rigid portion 150 so that only bolt 112 threads protrude. Insert 320 may be multiple inserts, such as two washers, one washer coupled to bolt 112 just under its head and one washer coupled to bolt 112 at the base of its threaded portion. Such washers would be sized to fit an inside diameter of rigid portion 150. Similarly, flexible portion 140 may include insert 142 that is coupled to second end portion 143 of flexible portion 140 and is adapted to receive the protruding portion of bolt 112 in removable threadable engagement.

In addition, tie-out 135 is removably coupled at a 90° angle to connector 130, though tie-out 135 may be removably coupled at other angles. Connector 130 is removably coupled to flexible portion 140 by a second bolt 111 extending through face plate 131 of connector 130. Second bolt 111 threadably engages insert 142 coupled to first end portion 141 of flexible portion 140 to secure tie-out 135 to connector 130. Insert 142 is adapted to receive threaded bolt 111 in removable threadable engagement.

FIG. 2 depicts certain components of an alternative variation of tie-out system 100. The principal differences between the tie-out system in FIGS. 1 and 3 and the tie-out system that comprises the components in FIG. 2 is securing pin 220. Securing pin 220 secures bar 133 of connector 130 within receiver 120. Both connector 130 and receiver 120 include apertures that extend through both and align when bar 133 of connector 130 is within receiver 120. For the exemplary purposes of this disclosure, the aligning apertures could be ½" diameter apertures. The aligning apertures are adapted to removably slidably receive securing pin 220, which would be slightly less than ½" in diameter for example. Once securing pin 220 is received through the aligning apertures, cotter pin 221 may be used to retain securing pin 220 in place.

Additionally, FIG. 2 depicts base 210, an alternative embodiment of base 110. Base 210 may be wider than base 110, such as, for the exemplary purposes of this disclosure, 4" in width. Furthermore, base 210 may include four bolts 113 for removably mounting tie-out system 100.

Referring to FIGS. 5–7b and although the invention may be readily adapted to a variety of embodiments of a tie-out system, tie-out system 500 is another example of a tie-out system of the invention. For the exemplary purposes of this disclosure, tie-out system 500 may be coupled to a trailer, but could be removably coupled to any device, object, product, building, structure, or the like suitable for use in retaining an animal such as a horse or other farm animal for example.

Generally, tie-out system 500 may include channeled base 510, receiver 520, connector 530, and tie-out 535. Base 510 configured to couple to a structure. Coupled to base 510 is receiver 520 configured to removably and rotatingly receive connector 530. Connector 530 is configured to rotate within receiver 520 and to removably couple receiver 520 to tie-out 535. Tie-out 535 includes a rigid portion 550 removably coupled to a flexible portion 540. Rigid portion 550 of tie-out 535 includes a first end portion 551 and a second end portion 553, and flexible portion 540 of tie-out 535 includes a first end portion 541 and a second end portion 543. First end portion 541 of flexible portion 540 is coupled to upper portion 531 of connector 530 and second end portion 543 of flexible portion 540 is coupled to first end portion 551 of rigid portion 550.

Describing tie-out system 500 in greater detail, base 510 may be permanently coupled to a trailer or any other structure, but could be configured to be removably coupled. For the exemplary purposes of this disclosure, base 510 may be a rectilinear (e.g. polygonal) channeled base comprising base portion 515 having opposing sides 517 and 518 extending outwardly and substantially perpendicular therefrom. Base portion 515 may comprise a pair of opposing apertures 578 and 579 (not shown) configured to receive therethrough a pair of bolts 113 (not shown) or other mechanical fasteners so as to couple channeled base 510 to a trailer. Opposing sides 517 and 518 may each comprise beveled corner portions configured to provide clearance for flexible portion 540 as connector 530 rotates in receiver 520. For the exemplary purposes of this disclosure, channeled base 510 may be approximately 6" long, and base portion 515 may be approximately 2" wide with opposing sides 517 and 518 protruding therefrom approximately 1". Approximately 1½" on each end of opposing sides 517 and 518 may be beveled (i.e. beveled corner portions). Opposing apertures 578 and 579 (not shown) may be approximately 9/16" in diameter and may be centered approximately ¾" from the ends of base portion 515. Notwithstanding, channeled base 510 may be a variety of widths, lengths, depths, and the like.

Receiver 520 is configured to removably and rotatingly receive connector 530. For the exemplary purposes of this disclosure, receiver 520 may be an annularly cylindrical receiver that may be approximately 3" in length an may have an approximately 1" to 2" diameter circular opening, though the length and opening could be various sizes and/or shapes depending upon the shape and size of connector 530. Annularly cylindrical receiver 520 may be centrally coupled to opposing sides 517 and 518 of channeled base 510. Annularly cylindrical receiver 520 may include aligning aperture 522 configured to removably receive securing pin 220 to removably couple lower portion 533 of connector 530 within receiver 520. Aligning aperture 522 may extend substantially perpendicularly and entirely through receiver 520 and may be centered equidistant from each end of receiver 520. For the exemplary purposes of this disclosure, aligning aperture 522 may be approximately 0.634" in diameter. Channeled base 510, as previously described, allows clearance for receiver 520 to removably receive connector 530 without interfering with, for example, rain gutters on a trailer or heads of bolts 113 of base 510.

Connector 530 is configured to rotate within receiver 520 and to removably couple receiver 520 to tie-out 535. Connector 530 may include lower portion 533 and upper portion 531. Lower portion 533 may be removably and rotatingly coupled within receiver 520, while upper portion 531 may be coupled to tie-out 535.

For the exemplary purposes of this disclosure, lower portion 533 may comprise a cylindrical lower portion but could be any shape depending upon the shape of receiver 520. Cylindrical lower portion 533 may have a diameter of approximately 1" to 2" and may be of any length suitable for removable slidable engagement with receiver 520, such as approximately 3". Lower portion 533 may also comprise a pair of aligning apertures 580 and 582 configured to removably receive securing pin 220 to removably couple lower portion 533 within receiver 520. Aligning apertures 580 and 582 may extend substantially perpendicularly and entirely through lower portion 533 and may be centered equidistant from each end of lower portion 533. For the exemplary purposes of this disclosure, aligning apertures 580 and 582 may intersect and be oriented substantially perpendicular to one another. Aligning apertures 580 and 582 may also each be approximately 0.634" in diameter.

Upper portion 531 may be any size, shape (e.g. rectilinear (e.g. polygonal), curvilinear (e.g. obround), any combination thereof), or the like suitable for allowing connector portion 530 to removably couple with tie-out 535. For the exemplary purposes of this disclosure, upper portion 531 may be partially obround in shape and may be approximately 2.75" in length. Furthermore, partially obround upper portion 531 may comprise opposing faces 532 and 534 thereon with through aperture 584 therebetween. Face 532 is configured to receive first end portion 541 of flexible portion 540, and may comprise a distance between through aperture 584 and its lower edge of approximately 1.375". Face 534 is configured to allow clearance of mounting bolt 111 head. Through aperture 584 may be approximately 0.516" in diameter.

Describing tie-out 535 in greater detail, tie-out 535 is configured to restrain an animal attached thereto and may include flexible portion 540 with first end portion 541 and second end portion 543 and rigid portion 550 with first end portion 551 and second end portion 553. First end portion 541 of flexible portion 540 may be coupled to face 532 of upper portion 531 of connector 530 and second end portion 543 of flexible portion 540 may be coupled to first end portion 551 of rigid portion 550. Channeled base 510, as previously described, allows clearance for connector 530 and tie-out 535 to rotate so that tie-out 535 may be flush against a trailer side to store it attached to a trailer while traveling for example.

Flexible portion 540 may be coupled to rigid portion 550 to form tie-out 535 in virtually any manner. For example, rigid portion 550 may be coupled to flexible portion 540 by at least one threaded bolt 112 coupled to first end portion 551 of rigid portion 550 in removable threadable engagement with at least one flexible portion insert 142 configured to receive threaded bolt 112. Specifically, threaded bolt 112 may extend through at least one insert 320. Insert 320 may be secured within first end portion 551 of rigid portion 550 so that only bolt 112 threads protrude. Insert 320 may be multiple inserts, such as two washers for example, one washer coupled to bolt 112 just under its head and one washer coupled to bolt 112 at the base of its threaded portion. Such washers would be sized to fit an inside diameter of rigid portion 550. Similarly, flexible portion 540 may include insert 142 that is coupled to second end portion 543 of flexible portion 540 and is configured to receive the protruding portion of bolt 112 in removable threadable engagement.

Alternatively, second end portion 543 of flexible portion 540 may include a sleeve or insert, each of which may be threaded, that protrudes inwardly therefrom. The internally threaded sleeve or insert of second end portion 543, for example, would threadably engage a projection coupled to first end portion 551 of rigid portion 550, or first end portion 551 of rigid portion 550 itself, to secure flexible portion 540 to rigid portion 550.

Tie-out 535 may be coupled perpendicular to connector 530, though tie-out 535 may be coupled at other angles. Particularly, flexible portion 540 may be removably coupled to connector 530 in virtually any manner as well. For example, face 532 of upper portion 531 of connector 530 may be removably coupled to flexible portion 540 by a second bolt 111 extending through bolt hole 584 of upper portion 531 of connector 530. Second bolt 111 may threadably engage insert 142 coupled to first end portion 541 of flexible portion 540 to secure tie-out 535 to connector 530. Insert 142 may be configured to receive threaded bolt 111 in removable threadable engagement.

Alternatively, face 532 of upper portion 531 of connector 530 may include a sleeve or projection, each of which may be threaded, that protrudes outwardly therefrom. The internally threaded sleeve of face 532, for example, would threadably engage a projection coupled to first end portion 541 of flexible portion 540, or first end portion 541 of flexible portion 540 itself, to secure tie-out 535 to connector 530. The threaded projection, of face 532, for example, would threadably engage insert 142 coupled to first end portion 541 of flexible portion 540 to secure tie-out 535 to connector 530.

Flexible portion 540 has a quiescent state and a flexed state, such that flexible portion 540 may be able to flex and bend axially, but may be strong and resilient enough to return to its previous position. Flexible portion 540 may be of varied shapes, sizes, styles, measurements, materials, and/or the like according to particular situations and needs. In one embodiment and for the exemplary purposes of this disclosure, flexible portion 540 may be approximately 9" long with approximately a 2⅝" outside diameter, but could have various lengths and have various outside diameters depending upon the amount of applied pressure it will be subject to, among other variables.

Rigid portion 550 is configured to both provide for tie loop 560 and to extend tie-out 535 far enough away from the particular structure tie-out system 500 is mounted to to safely accommodate an attached animal while distancing him away therefrom. Rigid portion 550 may be of varied shapes, sizes, styles, measurements, materials, and/or the like according to particular situations and needs. In one embodiment and for the exemplary purposes of this disclosure, rigid portion 550 may be approximately 38" long with approximately a 1⅞" outside diameter but could be of varied lengths and outside diameters according to particular situations and needs and depending upon the materials used and the strength required. In another embodiment and for the exemplary purposes of this disclosure, if flexible portion 540 is long enough to extend tie-out 535 far enough away from the particular structure tie-out system 500 is mounted to to safely accommodate an attached animal while distancing him away therefrom, rigid portion 550 may be reduced in size and/or measurements (e.g. length) down to only that necessary to couple with tie loop 560, or alternatively, rigid portion 550 may be excluded all together and tie loop 560 could be coupled to second end portion 543 of flexible portion 540.

Figure 5:
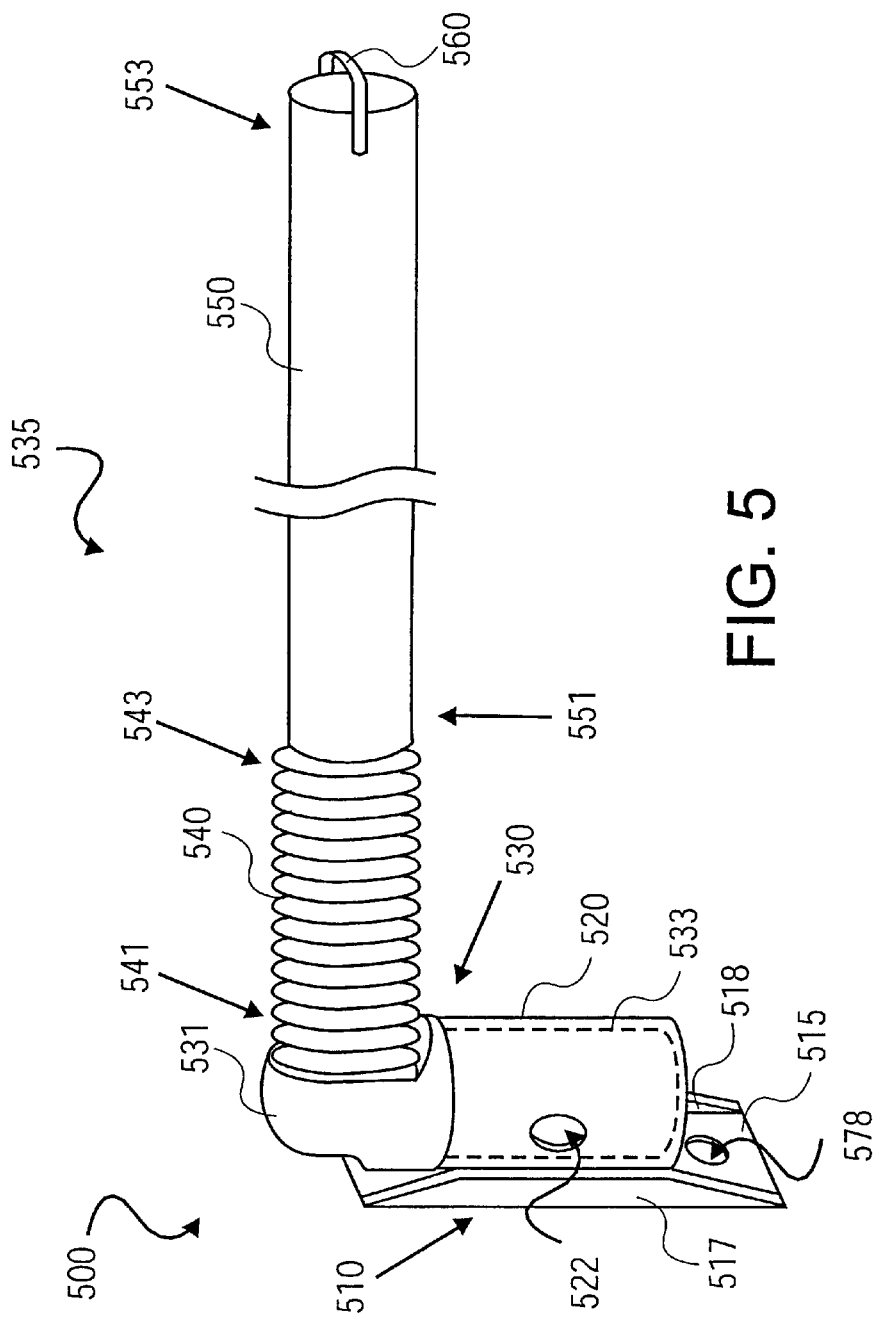
FIG. 5 is an isometric view of still another tie-out system of the invention.

Tie loop 560 is configured to couple with a tie attached to an animal. In an embodiment and for the exemplary purposes of this disclosure, tie loop 560 may be coupled to second end portion 553 of rigid portion 550. Tie loop 560 may extend substantially longitudinally outwardly from second end portion 553 of rigid portion 550 as depicted in FIG. 5. For the exemplary purposes of this disclosure, tie loop 560 may be a bale of approximately ⁵⁄₁₆" to ½" diameter curved rod that defines approximately a 2¼" opening at second end portion 553 of rigid portion 550, but could be of various diameters and could define a variety of opening sizes. Furthermore, tie loop 560 could include a series of tie loops positioned longitudinally along second end portion 553 of rigid portion 550 so that attachment of a tie, as hereinafter described, may be located depending upon the animal and the estimated amount of pressure the animal will exert on flexible portion 540.

Figures 8A, 8B:
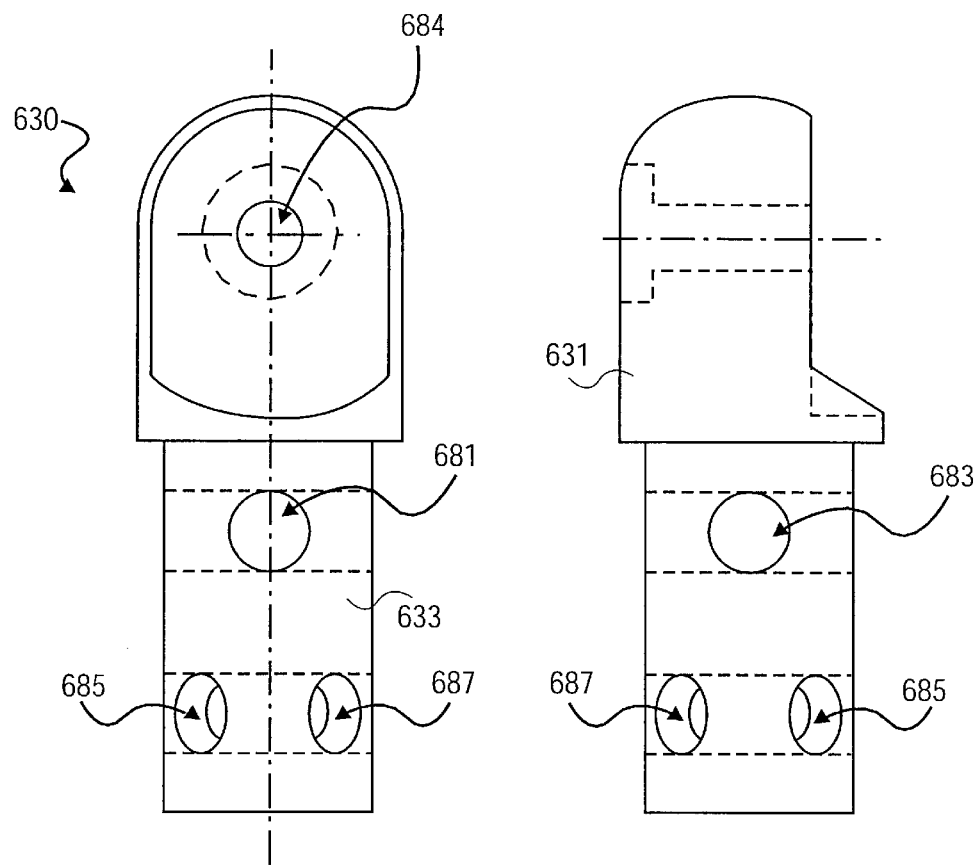
FIGS. 8a and 8b are front and side plan views respectively of various components of yet another tie-out system of the invention.

FIGS. 8a–8b depict certain components of the alternative variation of tie-out system 500. The principal differences between the components of tie-out system 500 in FIGS. 5–7b and the components of the alternative variation of tie-out system 500 in FIGS. 8a–8b is connector 630 and an associated receiver. Since flexible portion only couples to one side of connector 630, upper portion 631 may be substantially obround. That is, upper portion 631 may include only face 532. In place of face 534 may be counter sunk through aperture 684. The counter sunk portion may be opposite face 532 and may be approximately ½" deep and approximately ¾" in diameter. Lower portion 633 may comprise two paired sets of apertures configured to removably receive securing pin 220 to removably couple lower portion 633 within a receiver. Aligning apertures 681 and 683 and aligning apertures 685 and 687 each may extend substantially perpendicularly and entirely through lower portion 633 and may be positioned at each end portion of lower portion 633. For the exemplary purposes of this disclosure, aligning apertures 681 and 683 may intersect and be oriented substantially perpendicular to one another and aligning apertures 685 and 687 may intersect and be oriented substantially perpendicular to one another. A receiver for this variation of connector would include a pair of corresponding aligning apertures. Thus, connector 630 may be able to rotate within a receiver and be removably secured at a plurality of angles, such as 0°, 45°, 90°, 135°, and 180° for example.

It will be understood by those of ordinary skill in the art that the invention is not limited to the specific tie-out systems and components, like tie-out systems 100, 500, and the like, as any component of any tie-out system may be used, as well as any combination of any component of any tie-out system, consistent with the intended mechanical operation of a tie-out system of the invention. Thus, for example, upper portion 631 and/or lower portion 633 of connector 630 may be used in place of upper portion 531 and/or lower portion 533 of connector 530 respectively.

The components defining any tie-out system embodiment of the invention may be formed of any of many different types of materials or combinations thereof that may readily be formed into shaped objects provided that the components selected are consistent with the intended mechanical operation of a tie-out system of the invention. Accordingly, the components may be formed of metals, such as zinc, magnesium, iron, steel, other like materials and/or any combination thereof, alloys, such as aluminum, other like materials and/or any combination thereof, flexible/resilient materials, such as rubber, fiberglass, plastics, composites, other like materials and/or any combination thereof, any other suitable material, and/or any combination thereof. For example, bases 110 and 510, receivers 120 and 520, connectors 130 and 530, rigid portions 150 and 550, tie loops 160 and 560, and flexible portions 140 and 540 may be made out of a metal, such as steel. Base 110 may be a steel plate, receiver 120 may be a steel hitch receiver, and connector 130 may be a steel bar hitch. Rigid portion 150 may be a 13 gauge galvanized steel pipe, tie loop 160 may be a steel rod, and flexible portion 140 may be an oil tempered hardened steel expansion spring. Likewise, and for example, base 510 may be a steel channel, receiver 520 may be a steel hitch receiver, and connector 530 may be a steel bar hitch. Rigid portion 550 may be a 13 gauge galvanized annularly cylindrical steel pipe or steel bar, tie loop 560 may be a steel rod, and flexible portion 540 may be an oil tempered hardened steel expansion spring. Nevertheless, for example, flexible portions 140 and 540 may be formed in whole or in part from other materials that are able to flex and bend axially, but strong and resilient enough to return to their previous positions, such as rubber, fiberglass, plastics, composites, other like materials and/or any combination thereof.

The components defining any tie-out system embodiment of the invention may be purchased pre-manufactured or manufactured separately and then coupled together. However, any or all of the components may be manufactured simultaneously and integrally coupled with one another. Manufacture of these components separately or simultaneously may involve extrusion, injection molding, casting, milling, cutting, welding, soldering, riveting, punching, and/ or the like. If any of the components are manufactured separately, they may then be coupled with one another in any manner known in the art, such as with adhesive, a weld, a fastener(e.g. a bolt or a rivet), any combination thereof, and/or the like for example, depending upon, among other considerations, the particular material forming the components.

For example, base 110 may be coupled to receiver 120 with spacer 115 separating them. This coupling might be a weld. Tie loop 160 may be coupled to second end portion 153 of rigid portion 150. This coupling might be a weld, though bolts could couple tie loop 160 to second end portion 153 of rigid portion 150. Inserts 142 may be coupled to first end portion 141 and second end portion 143 of flexible portion 140 respectively. For example, if flexible portion 140 is a spring as described previously, inserts 142 may be cast or machined to match the inside coils of the spring. Bolt 112 and insert 320 may be coupled together and then the combination of bolt 112 and insert 320 may be coupled to first end portion 151 of rigid portion 150. First end portion 151 of rigid portion 150 may be coupled to second end portion 143 of flexible portion 140, and then first end portion 141 of flexible portion 140 may be coupled to face plate 531 of connector 130.

Similarly, for example, base 510 may be welded to receiver 520. Tie loop 560 may be coupled to second end portion 553 of rigid portion 550. This coupling might be a weld, though bolts could couple tie loop 560 to second end portion 553 of rigid portion 550. Inserts 542 may be coupled to first end portion 541 and second end portion 543 of flexible portion 540 respectively. For example, if flexible portion 540 is a spring as described previously, inserts 542 may be cast or machined to match the inside coils of the spring. Bolt 112 and insert 320 may be coupled together and then the combination of bolt 112 and insert 320 may be coupled to first end portion 551 of rigid portion 550. First end portion 551 of rigid portion 550 may be coupled to second end portion 543 of flexible portion 540, and then first end portion 541 of flexible portion 540 may be coupled to face 532 of upper portion 531 of connector 530.

Alternatively, for example, flexible portion 540 and rigid portion 550 may be integrally coupled to one another. Likewise, upper portion 531 and lower portion 533 of connector 530 may be integrally coupled to one another. Similarly, base portion 515 and opposing sides 517 and 518 of base 510 may be integrally coupled to one an other.

Other possible steps might include sand blasting, polishing, powder coating, and/or painting the components defining any tie-out system embodiment of the invention. For example, tie-out systems 100 and 500 may be sand blasted and/or polished and may be powder coated and/or painted to a desired color (e.g. to match the color of a trailer). Alternatively, only certain components of tie-out systems 100 and 500, such as bases 110 and 510, spacer 115, receivers 120 and 520 and tie-outs 135 and 535, may be coated to a desired color, while connectors 130 and 530 may be polished.

For the exemplary purposes of this disclosure, in describing the use of tie-out systems of the invention further, reference is made to FIG. 4, in which tie-out system 100 is shown in conjunction with a generic trailer 400 of any of a number of well known types.

Accordingly, base 110 is permanently coupled to trailer 400 by utilizing at least two bolts 113. Receiver 120 is coupled to and set out from base 110. Bar 133 of connector 130 is removably located within receiver 120. Rigid portion 150 and flexible portion 140 are removably coupled together to form tie-out 135, and tie-out 135 is removably coupled to face plate 131 of connector 130. Connector's 130 detachability from receiver 120 allows tie-out 135 to be used on any other location on trailer 400, another trailer, or another structure that has a base 110 and a receiver 120 attached. Thus, additional bases 10 and receivers 120 may be mounted at other convenient locations or structures to receive a detached connector 130 and tie-out 135 as the need arises. Additionally, tie-out system 100 may be left attached to trailer 400 while traveling, or removed from trailer 400 and stored separately while traveling.

Once tie-out system 100 is mounted to trailer 400, a horse or other animal is attached to tie-out system 100 by coupling a tie attached to the animal to rigid portion 150 with tie loop 160 attaching the tie in position. The tie could be a rope, bungee cord, strap, or the like. Additionally, the tie could be removably coupled to rigid portion 150 by such mechanisms as a quick release, VELCRO, and the like.

After the animal is attached to tie-out system 100 and referring to FIG. 4, the application of a predetermined amount of pressure exerted by the animal on flexible portion 140 moves flexible portion 140 from quiescent state 410 to flexed state 412. However, flexible portion 140 returns to quiescent state 410 as the amount of pressure exerted by the animal lessens to an amount below the predetermined amount of pressure. Because of the resiliency of flexible portion 140, tie-out 135 may be able to flex and bend axially and return to its previous position. Thus, flexible portion 140 absorbs the pulls and tugs of the animal and provides resistance, thereby eventually causing the animal to tire and to stop pulling. Furthermore, as the animal pulls and tugs, the damping ability of flexible portion 140 prevents damage to trailer 400, tie-out system 100, and the animal. Moreover, flexible portion 140 may allow for total universal motion of tie-out 135 as the animal pulls while effectively restraining the animal.

Notwithstanding, it will be understood by those of ordinary skill in the art that the invention is not limited to the foregoing description of the use of tie-out system 100 and the other specific structures illustrated in FIG. 4, as tie-out system 500 and any other structures within the scope of the invention may be utilized as well.

Accordingly, tie-out system 500 may be used in conjunction with a generic trailer 400 of any of a number of well known types as well for example. Base 510 may be coupled to trailer 400 by utilizing at least two bolts 113. Receiver 520 may be coupled to base 510. Lower portion 533 of connector 530 may be removably located within receiver 520. Rigid portion 550 and flexible portion 540 may removably couple together to form tie-out 535, and tie-out 535 may be removably coupled to upper portion 531 of connector 530. Connector's 530 detachability from receiver 520 allows tie-out 535 to be used on any other location on trailer 400, another trailer, or another structure that has a base 510 and a receiver 520 attached. Thus, additional bases 510 and receivers 520 may be mounted at other convenient locations or structures to receive a detached connector 530 and tie-out 535 as the need arises.

Additionally, tie-out system 500 may be rotated and stored attached to the trailer while traveling, or removed from the trailer and stored separately while traveling. Both of these features are due to tie-out systems detachability and rotatability. Particularly, and with reference to FIGS. 6a–6b, connector 530 is configured to rotate within receiver 520 and to removably couple receiver 520 to tie-out 535. Lower portion 533 of connector 530 may be removably and rotatingly coupled within receiver 520. Receiver 520 may comprise aligning aperture 522 and lower portion 533 may comprise a pair of aligning apertures 580 and 582, each of which is configured to removably receive securing pin 220 to removably couple lower portion 533 within receiver 520 depending upon the rotational position of connector 530. Aligning apertures 580 and 582 may extend substantially perpendicularly and entirely through lower portion 533 and may be centered equidistant from each end of lower portion 533.

Figure 6A:
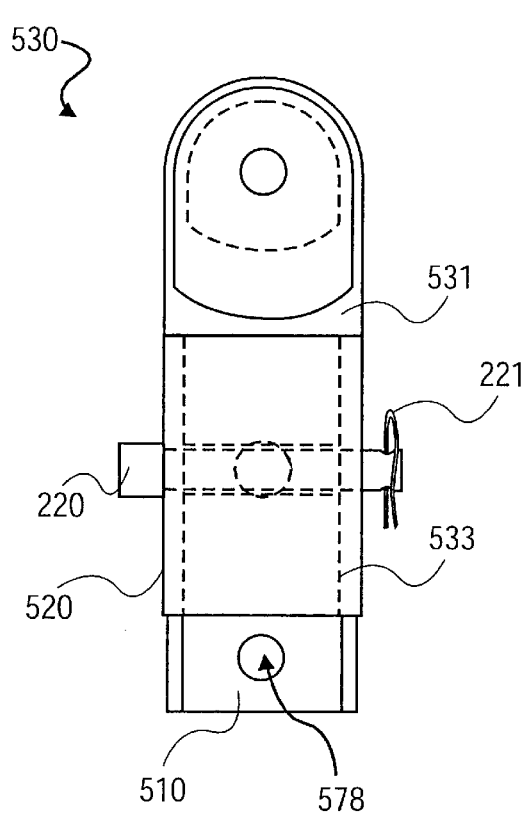
FIGS. 6a and 6b are front and side plan views respectively of various components of the tie-out system of FIG. 5.
Figure 6B:
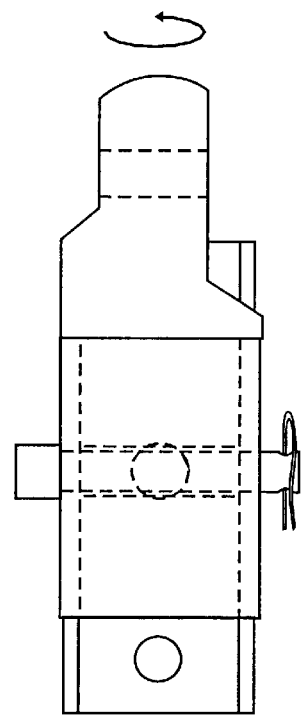
Figures 7A, 7B:
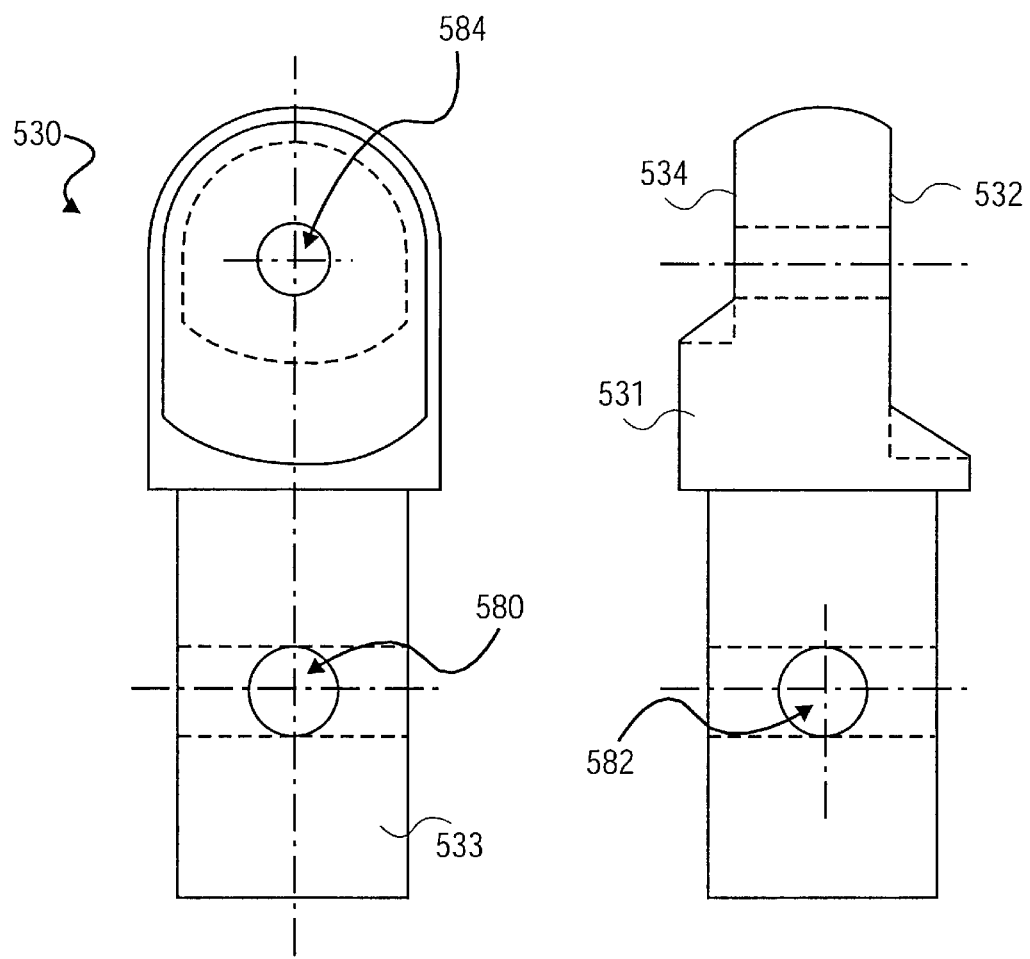
FIGS. 7a and 7b are front and side plan views respectively of various components of the tie-out system of FIG. 5.

For the exemplary purposes of this disclosure, aligning apertures 580 and 582 may intersect and be oriented substantially perpendicular to one another. The aligning apertures are adapted to removably slidably receive securing pin 220, so that securing pin 220 may secure lower portion 533 of connector 530 within receiver 520 at a desired position depending upon rotation of connector 530. Once securing pin 220 is removably received through the selected aligning apertures, cotter pin 221 may be used to retain securing pin 220 in place. As depicted in FIG. 6a, securing pin 220 is holding connector in an operative position (e.g. tie-out 535 extending outwardly from trailer 400 to restrain an animal attached thereto), while in FIG. 6b connector 530 has been rotated approximately 90° so that securing pin is holding connector 530 in an inoperative position (e.g. tie-out 535 stored attached to trailer 400 while traveling). Thus, an advantage of tie-out system 500 over tie-out system 100 is that tie-out 535 may rotate without having to lift connector 530 out of receiver 520, which is advantageous especially when tie out 535 is formed from heavy materials such as metals and/or is located high up on the railer for example.

Once tie-out system 500 is mounted to trailer 400, a horse or other animal may be attached to tie-out system 500 by coupling a tie attached to the animal to rigid portion 550 with tie loop 560 attaching the tie in position. The tie could be a rope, bungee cord, strap, or the like. Additionally, the tie could be removably coupled to rigid portion 550 by such mechanisms as a quick release, VELCRO, and the like.

After the animal is attached to tie-out system 500, the application of a predetermined amount of pressure exerted by the animal on flexible portion 540 may move flexible portion 540 from a quiescent state to a flexed state. However, flexible portion 540 may return to its quiescent state as the amount of pressure exerted by the animal lessens to an amount below the predetermined amount of pressure. Because of the resiliency of flexible portion 540, tie-out 535 may be able to flex and bend axially and return to its previous position. Thus, flexible portion 540 may absorb the pulls and tugs of the animal and provide resistance, thereby eventually causing the animal to tire and to stop pulling. Furthermore, as the animal pulls and tugs, the damping ability of flexible portion 540 may prevent damage to trailer 400, tie-out system 500, and the animal. Moreover, flexible portion 540 may allow for total universal motion of tie-out 535 as the animal pulls while effectively restraining the animal.

Thus, in contrast to conventional, permanent, structurally rigid, fixed tie-outs and their bending/breaking, trailer incompatibility, non-detachability, and non-rotatability drawbacks, the tie-out system embodiments of the present invention are configured to mount easily for set-up, adjustment, storage, and the like on horse trailers or other structures. Depending upon the particular embodiment, a tie-out system may include a base. Coupled to the base may be a receiver configured to both receive a connector and, in some embodiments, allow rotation of the same therein. The connector may be coupled to a tie-out that includes a flexible portion, the flexible portion configured to both allow substantially universal motion of the tie-out and dampen the pulls and tugs of an animal, while preventing damage to a trailer or other structure, the tie-out, and the animal. The tie-out may be rotated and stored attached to or removed from a trailer while traveling. Furthermore, by having additional bases and receivers mounted where convenient, a detached tie-out may be moved to multiple sites on the trailer or to a building or other structure as the need arises.

The embodiments and examples set forth herein were presented in order to best explain the invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, unless otherwise specified, any components of the invention indicated in the drawings or herein are given as an example of possible components and not as a limitation.

What is claimed is:

1. A tie-out system comprising:
    a base configured to couple to a structure;
    a receiver configured to removably and rotatingly receive a connector, the receiver coupled to the base;
    the connector configured to rotate within the receiver and to removably couple the receiver to a tie-out, the connector comprising a lower portion and an upper portion, the lower portion removably and rotatingly coupled within the receiver; and
    the tie-out configured to restrain an animal attached thereto, the tie-out coupled to the upper portion of the connector and comprising a flexible portion.

2. The tie-out of claim 1, the base comprising a channeled base comprising a base portion having opposing sides extending outwardly and substantially perpendicular therefrom.

3. The tie-out of claim 1, the receiver comprising an annularly cylindrical receiver.

4. The tie-out of claim 1, the lower portion of the connector comprising a cylindrical lower portion.

5. The tie-out of claim 1, the upper portion of the connector comprising a partially obround upper portion.

6. The tie-out of claim 1, the receiver and the lower portion of the connector each comprising aligning apertures configured to removably receive a securing pin to removably couple the lower portion of the connector within the receiver.

7. The tie-out system of claim 6, the lower portion of the connector comprising a pair of aligning apertures.

8. The tie-out of claim 7, the pair of aligning apertures intersecting and oriented substantially perpendicular to one another.

9. The tie-out of claim 1, the flexible portion comprising a first end portion and a second end portion, the first end portion coupled to the upper portion of the connector.

10. The tie-out of claim 1, the flexible portion comprising a spring.

11. A tie-out system for use with a trailer, the tie-out system comprising:
    a channeled base configured to couple to the trailer, the channeled base comprising a base portion having opposing sides extending outwardly and substantially perpendicular therefrom;
    an annularly cylindrical receiver configured to removably and rotatingly receive a connector, the receiver coupled to the channeled base;
    the connector configured to rotate within the receiver and to removably couple the receiver to a tie-out, the connector comprising a cylindrical lower portion and an upper partially obround portion, the lower portion removably and rotatingly coupled within the receiver; and
    the tie-out configured to restrain an animal attached thereto, the tie-out comprising a flexible portion, the flexible portion having a quiescent state and a flexed state, whereby the application of a predetermined amount of pressure on the flexible portion will move the flexible portion from its quiescent state to its flexed state, the flexible portion configured to return to its quiescent state as the predetermined amount of pressure lessens to an amount below the predetermined amount of pressure, the flexible portion comprising a first end portion and a second end portion, the first end portion coupled to the upper portion of the connector.

12. The tie-out system of claim 11, the base portion of the channeled base comprising a pair of opposing apertures configured to receive therethrough a pair of bolts so as to couple the tie-out system to the trailer.

13. The tie-out system of claim 11, the opposing sides of the channeled base each comprising at least one beveled corner portion configured to provide clearance for the flexible portion as the connector rotates in the receiver.

14. The tie-out system of claim 11, the upper portion of the connector comprising at least one face thereon, the first end portion of the flexible portion coupled to the at least one face.

15. The tie-out of claim 1, the receiver and the lower portion of the connector each comprising aligning apertures configured to removably receive a securing pin to removably couple the lower portion of the connector within the receiver.

16. The tie-out system of claim 15, the lower portion of the connector comprising a pair of aligning apertures.

17. The tie-out of claim 16, the pair of aligning apertures intersecting and oriented substantially perpendicular to one another.

18. The tie-out system of claim 11, the tie-out comprising a rigid portion having a first end portion and a second end portion, the first end portion of the rigid portion coupled to the second end portion of the flexible portion.

19. The tie-out system of claim 18, wherein the rigid portion is one of a bar and a pipe.

20. The tie-out system of claim 19, wherein the bar is cylindrical and the pipe is annularly cylindrical.

21. A tie-out system for use with a trailer, the tie-out system comprising:
- a channeled base configured to couple to the trailer, the channeled base comprising a base portion having opposing sides extending outwardly and substantially perpendicular therefrom, the base portion comprising a pair of opposing apertures configured to receive therethrough a pair of bolts so as to couple the tie-out system to the trailer, the opposing sides each comprising beveled corner portions configured to provide clearance for the flexible portion as the connector rotates in the receiver;
- an annularly cylindrical receiver configured to removably and rotatingly receive a connector, the receiver coupled to the opposing sides of the channeled base;
- the connector configured to rotate within the receiver and to removably couple the receiver to a tie-out, the connector comprising a cylindrical lower portion and a partially obround upper portion comprising at least one face thereon, the lower portion removably and rotatingly coupled within the receiver, the receiver and the lower portion of the connector each comprising aligning apertures configured to removably receive a securing pin to removably couple the lower portion of the connector within the receiver; and
- the tie-out configured to restrain an animal attached thereto, the tie-out comprising:
  - a rigid portion with a first end portion and a second end portion; and
  - a flexible portion having a quiescent state and a flexed state, whereby the application of a predetermined amount of pressure on the flexible portion will move the flexible portion from its quiescent state to its flexed state, the flexible portion configured to return to its quiescent state as the predetermined amount of pressure lessens to an amount below the predetermined amount of pressure, the flexible portion comprising a first end portion and a second end portion, the first end portion coupled to the at least one face of the upper portion of the connector and the second end portion coupled to the first end portion of the rigid portion.

22. The tie-out system of claim 21, the lower portion of the connector comprising a pair of aligning apertures.

23. The tie-out of claim 22, the pair of aligning apertures intersecting and oriented substantially perpendicular to one another.

24. The tie-out system of claim 21, the rigid portion comprising a tie loop coupled thereto.

25. The tie-out system of claim 24, the tie loop coupled to the second end portion of the rigid portion.

26. The tie-out system of claim 25, the tie loop extending substantially longitudinally outwardly from the second end portion of the rigid portion.

27. The tie-out system of claim 25, the tie loop comprising a series of tie loops positioned longitudinally along the second end portion of the rigid portion.

* * * * *

UNITED STATES PATENT AND TRADEMARK OFFICE
CERTIFICATE OF CORRECTION

PATENT NO.     : 6,662,751 B1
DATED          : December 16, 2003
INVENTOR(S)    : Rutter Page 1 of 1

It is certified that error appears in the above-identified patent and that said Letters Patent is hereby corrected as shown below:

<u>Column 15,</u>
Line 1, Claim 15 should read as follows:
-- The tie-out of claim 11, the receiver and the lower portion of the connector each comprising aligning apertures configured to removably receive a securing pin to removably couple the lower portion of the connector within the receiver. --

Signed and Sealed this

Sixth Day of April, 2004

JON W. DUDAS
*Acting Director of the United States Patent and Trademark Office*